United States Patent [19]

Rion

[11] 3,805,447
[45] Apr. 23, 1974

[54] SOIL BINDING AND SOIL MULCHING COMPOSITIONS

[75] Inventor: Pat F. Rion, Borger, Tex.

[73] Assignee: Phillips Petroleum Company, Bartlesville, Okla.

[22] Filed: Jan. 29, 1973

[21] Appl. No.: 325,641

Related U.S. Application Data

[63] Continuation-in-part of Ser. No. 225,664, Feb. 11, 1972, abandoned.

[52] U.S. Cl............ 47/9, 106/287 SS, 260/29.6 PM, 260/33.6 AQ, 260/DIG. 14
[51] Int. Cl.............................................. A01g 1/00
[58] Field of Search.................... 47/9, 58, DIG. 10; 106/287 SS; 260/DIG. 14, 33.6 AQ, 29.6 PM, 28.5

[56] References Cited
UNITED STATES PATENTS

| | | |
|---|---|---|
| 1,882,377 | 10/1932 | Whittelsey ............................... 47/9 |
| 2,333,959 | 11/1943 | Smith ......................................... 47/9 |
| 2,961,799 | 11/1960 | Coe ............................................ 47/9 |
| 2,978,427 | 4/1961 | Pullar et al. ......................... 260/28.5 |
| 3,281,986 | 11/1966 | Les ............................................. 47/9 |
| 3,310,909 | 3/1967 | Bennett ..................................... 47/9 |
| 3,323,254 | 6/1967 | Gat et al. ................................. 47/9 |
| 3,337,987 | 8/1967 | Bennett ..................................... 47/9 |
| 3,503,774 | 3/1970 | Weymouth ............................. 47/9 X |

Primary Examiner—Robert E. Bagwill

[57] ABSTRACT

A soil binding composition having increased shear stability and good soil binding strength is provided comprising an emulsion containing a thermoplastic elastomer of the styrene-butadiene block copolymer type which is soluble in trichloroethylene to give a viscosity of about 200 to 1,000 centipoises at room temperature at a polymer concentration of 15 percent by weight, and having a modulus at 300 percent of 200 psi or higher, a coumarone-indene resin, a polar solvent which is an unsaturated resinous oil that is nonvolatile under atmospheric conditions, a chlorinated hydrocarbon solvent which is volatile under atmospheric conditions, a nonpolar solvent of the aromatic hydrocarbon type which is volatile under atmospheric conditions and has a viscosity in the range of 1,000 to 5,000 centipoises at 77° F, a cationic emulsifier, and water. In another embodiment, hydraulic mulch compositions are provided by diluting the above-defined soil binding compositions with water, commercial fertilizer, cellulose mulch, and seeds.

8 Claims, No Drawings

SOIL BINDING AND SOIL MULCHING COMPOSITIONS

This is a continuation-in-part application of my copending application Ser. No. 225,664, filed Feb. 11, 1972, entitled "Soil Binding Emulsion," now abandoned.

This invention relates to soil binding and soil mulching compositions. In accordance with another aspect, this invention relates to soil binding compositions having increased shear stability and good bonding strength comprising an emulsion in which the oil phase contains an aromatic oil having a viscosity in the range of 1,000 to 5,000 centipoises at 77° F. In accordance with another aspect, this invention relates to soil binding compositions comprising an oil phase containing an aromatic oil having a viscosity in the range of 1,000 to 5,000 centipoises at 77° F having dissolved therein a rubber. In accordance with a further aspect, this invention relates to the treatment of soil with a soil binding composition comprising an oil-water emulsion in which the oil phase contains an aromatic oil having a viscosity of 1,000–5,000 centipoises at 77° F having dissolved therein a butadiene-styrene rubber re-sulting in an emulsion with increased shear stability and good soil binding strength. In accordance with still another aspect, emulsions containing seeds and fertilizer for hydraulic application to highway embankments, hillsides, etc. are produced by diluting the above-defined soil binding compositions with water, commercial fertilizer, cellulose mulch, and seeds.

In many areas soil erosion caused by wind and rain is a serious problem. Many expensive and time consuming efforts have been made to prevent or at least inhibit soil erosion. It is desirable to bind in place unconsolidated or loosely consolidated soil, which may be made up of clay, dust, silt, and/or sand. Examples of this exist in areas of erosion control, highway construction, and maintenance of clarity in water bodies used for recreation. Many existing commerical treatments are unsatisfactory for one reason or another. The present invention relates to improved soil binding compositions comprising oil-water emulsions resulting in an emulsion having increased shear stability and good soil binding strength.

One of the problems in maintaining the surface and grade of newly graded embankments and other surfaces of the ground in connection with ground surface and sub-surface construction and maintenance is in holding the surface of the raw earth against erosion until a surface-retaining vegetation such as grass, ground ivy, plants, bushes, or trees can be established.

In dry parts of the country the surface is subject to wind erosion and in wet areas to rainfall erosion. Embankments adjacent rivers, lakes and seas are subject to erosion by wave and current action. Efforts to plant grass and other seeds and to establish vegetation growth are frustrated by blowing and washing away of the surface soil and of the seeds during the periods of time before general growth is established over a substantial portion of the surface. Ordinary seed planting and plant growing methods are, therefore, expensive and unduly time consuming.

Accordingly, an object of this invention is to provide novel soil binding compositions.

Another object of this invention is to provide soil binding compositions having good soil binding strength.

Another object of this invention is to provide soil binding compositions for treating soil to provide a protective coating.

A further object of this invention is to treat soil with soil binding compositions to protect the soil from erosion by wind and rain.

A still further object of this invention is to provide hydraulic mulch compositions containing seeds and fertilizer for simultaneously seeding and mulching soil surfaces.

Still another object of this invention is to provide hydraulic mulch compositions adapted to be applied by machine spraying methods to large irregular soil-bearing areas.

Other objects and aspects as well as the several advantages of the invention will become apparent to those skilled in the art upon consideration of the following specification and claims.

In accordance with the invention set forth in said copending application, it has been discovered that formulation of an emulsion system having a water phase and an oil phase containing dissolved elastomer, when utilizing an aromatic oil with a viscosity in the range of 1,000 to 5,000 centipoises at 77° F, produces an emulsion with increased shear stability and good soil binding strength.

In accordance with the present invention, compositions suitable for simultaneously seeding and mulching soil areas are provided comprising diluting the above-defined soil binding emulsions with water, commercial fertilizer, cellulose mulch, and seeds. The resulting mulching compositions can be readily applied as a spray to a soil-bearing area.

The hydraulic mulch of this invention can be prepared by admixing the soil binding emulsion with the other ingredients, preferably with agitation, until all of the soil binding emulsion has been added.

In accordance with the overall concept of the invention set forth in said copending application, a solution of an elastomer is formed in an oil phase containing a suitable aromatic oil. The resulting solution is then emulsified in water and thereafter applied in a proper dilution at a desired rate to the soil. The preferred emulsification system is one resulting in a cationic emulsion. The aromatic oil in the preferred embodiment is substantially free of asphaltenes and has a viscosity in the range of 1,000 to 5,000 centipoises at 77° F, and has an aromatic content of at least 50 percent. Preferably, the oil should be soluble in n-pentane according to the method described in ASTM designation D 20006–65T. The elastomer should be soluble in the oil, and the oil should be compatible with the elastomer.

In one presently preferred embodiment of the invention, a mixture of two different aromatic oils is employed. For example, a mixture of about 90 parts by weight of Philrich* A trademark of Phillips Petroleum Company. 5 oil and 10 parts by weight of distilled $SO_2$ extract oil results in an aromatic oil having the desired viscosity characteristics and solubility characteristics defined above.

Philrich A trademark of Phillips Petroleum Company. 5 oil is a phenol-extracted gas oil having an aromatic content in excess of 50 percent and a viscosity of 11,400 centipoises at 77° F. It is frequently used as a rubber extender oil.

An $SO_2$ extract oil is produced by liquid-liquid extraction of a cycle oil recovered from the products of a catalytic cracking process. Sulfur dioxide is used as the selective solvent in the extractor, the sulfur dioxide selectively dissolving the aromatics from the feed oil and rejecting the non- aromatic portion. The aromatic product is recovered from the sulfur dioxide extract by distillation. The aromatic oil may be used directly as part of the oil phase in the preparation of the inventive emulsion or it may be additionally vacuum fractionated for removal of light and/or heavy ends. Also, the oil may be additionally purified by a lime treating step for removal of traces of sulfur dioxide and other impurities. For further details of the sulfur dioxide extraction process for the preparation of an aromatic oil which can be used in part and is suitable for the emulsions of this invention, see U. S. Pat. No. 3,007,979 to Peters.

Various blends of aromatic oils may be used to obtain a mixture with the desired viscosity of 1,000 to 5,000 centipoises at 77° F. Califlux GP is similar to Philrich A trademark of Phillips Petroleum Company. 5 oil and has a viscosity of 12,800 centipoises at 77° F. The $SO_2$ extract oil has a viscosity of 25 centipoises at 77°F. The three above-mentioned oils individually fall outside the desired viscosity range. However, the following blends fall within the desired range and provide the improved emulsions of my invention.

Viscosities of Aromatic Oils and Blends Thereof

| Parts by Weight, Oil | | | Viscosity, | Suitable |
| --- | --- | --- | --- | --- |
| $SO_2$ Ext. | Calif. GP | Philrich*-5 | Centipoises at 77°F | for invention |
| 0 | 100 | 0 | 12,800 | No |
| 10 | 90 | 0 | 3,130 | Yes |
| 20 | 80 | 0 | 1,110 | Yes |
| 25 | 75 | 0 | 660 | No |
| 50 | 50 | 0 | 100 | No |
| 100 | 0 | 0 | 25 | No |
| 0 | 0 | 100 | 11,400 | No |
| 10 | 0 | 90 | 3,305 | Yes |
| 20 | 0 | 80 | 1,190 | Yes |
| 25 | 0 | 75 | 770 | No |
| 30 | 0 | 70 | 525 | No |

*A trademark of Phillips Petroleum Company.

Similar oils with high aromatic contents and desirable viscosity characteristics can be prepared by solvent extraction of cycle oils using other selective solvents, for example, phenol, sulfolane, diethylene glycol, etc. If desired, mixtures of these oils or mixtures thereof with other oils can be employed so long as the ultimate blend possesses the required aromatic and viscosity values as above defined.

In addition to aromatic oil and rubber, the oil phase of my improved emulsion contains a chlorinated hydrocarbon solvent such as trichloroethylene, a resin such as a coumarone-indene resin which is miscible which but nonreactive with the elastomer and has a melting point in the order of 140° to 300° F and acts as a stiffening resin. A volatile aromatic solvent such as xylene, toluene, benzene, etc. is also used. The chlorinated hydrocarbon is employed in an amount sufficient to maintain the flash point above about 80° F and the amount of aromatic solvent (xylene) employed is sufficient to maintain the specific gravity of the emulsion base employed in forming the emulsion concentrate in the order of 1.0, e.g., 0.946 to 1.068.

The term "elastomer" as used herein is intended to include any type of rubber, natural or synthetic, which is soluble in the aromatic oils above described. Such elastomers are, for example, natural rubber, butadiene-styrene copolymers formed by either emulsion or solution processes, such as SBR 1500 (ASTM D-1419-62T), SBR block copolymers, cis-polyisoprene, and trans-polyisoprene. In one presently preferred embodiment of the invention, the elastomer is a solution-polymerized butadiene-styrene block copolymer having an average molecular weight of about 50,000 to 150,000.

The solution of elastomer in the aromatic oil phase, as described, is then emulsified in water. Typical of emulsification equipment which may be used in forming the emulsion are colloid mills, high-speed emulsifiers, ultrasonic emulsifiers, homogenizers, pipeline mixers, and the like. Any emulsification equipment can be used which produces a fine-particle-size emulsion of high stability, i.e., an emulsion which will not break on contact with the soil surface and which will penetrate into the soil to the depth desired.

The quantity of water employed in the soil binding emulsion can be varied within the scope of this invention and depends upon the treatment to be given to a particular soil. Generally, the emulsion system will contain 15 to 50 percent by weight of water; and from 85 to 50 percent by weight of the oil-rubber phase, including the elastomer dissolved therein, can be employed. The emulsion itself can be applied to soil or it can be further diluted with water, e.g., from 0.5 to 25 parts of water per part of emulsion concentrate, prior to its application to the soil to be treated.

In general, it is desirable that the emulsion be a stable emulsion, i.e., will not break until it has been applied to the soil and at least partially penetrated into the soil to the depth desired. The time required for penetration will depend, of course, on the grain size of the soil and the degree of compaction of the soil, as well as on the degree of dilution of the emulsion. Concerning the depth of penetration desired, a relatively concentrated emulsion will deposit the elastomer solution on the upper surface of the soil. A more dilute solution will distribute the elastomer more uniformly through the soil.

The oil-water soil binding emulsion of the invention after dilution with, say, 4 parts water can be spread at the rate of 0.10 to 1 gallon per square yard of soil. If desired, however, higher amounts of emulsion such as 2 or even 5 gallons per square yard of the soil can be applied, depending upon the degree of surface soil binding desired as well as the solubility characteristics of the particular polymer in the particular oil employed.

The concentration of the elastomer in the oil phase will depend upon the amount of polymer to be added to the soil and upon the concentration of the oil phase in the emulsion applied to the soil. A concentration ranging from about 2 to about 15 percent of elastomer based on the oil phase is most satisfactory. As indicated above, the rate of application of the oil emulsion to the soil can be varied to accommodate any construction specification.

In carrying out the process of the invention for soil binding, the solution of rubber in an oil phase is applied to the soil as an emulsion in which the water is the continuous phase and the rubber solution is the dispersed phase. This constitutes a preparation containing two media for depositing the rubber in the soil. The aromatic oil phase used to dissolve the rubber serves as a carrier for the rubber to be combined with the soil and as a solvent for the rubber. The water in the emulsion serves as a carrier for the solution to be deposited on the soil.

Suitable emulsifiers or surfactants that can be employed to produce the oil-water soil binding emulsions of the invention include Oronite NI-W, a water soluble nonionic surfactant of the alkylphenol-ethylene oxide condensate type from Chevron Chemical Company, and Redicote E-1, a cationic emulsifier sold by Armour Industrial Chemical Company.

As indicated hereinbefore, an emulsion containing seeds and fertilizer for hydraulic application to highway embankments, hillsides, etc. is made by diluting the above-defined soil binder emulsions with water, commercial fertilizer, cellulose mulch, and seeds.

The hydraulic mulch compositions will comprise:
a 5 to 15 weight percent of the oil-water soil binding emulsion,
b 2 to 5 weight percent commercial fertilizer,
c 1 to 3 weight percent cellulose mulch,
d up to about 5 weight percent seeds,
e suitable emulsifiers, and
f the balance water.

In one specific embodiment of the invention, stable hydraulic mulch emulsions containing seeds and fertilizer suitable for simultaneously seeding and mulching soil surfaces are made by diluting 9.4 parts of soil binder emulsion with 84.7 parts water, 3.6 parts commercial fertilizer, 1.9 parts cellulose mulch, and 0.4 parts seeds.

The soil binder emulsion employed in the hydraulic mulch compositions is made by emulsifying an oil phase containing rubber and an aromatic oil as defined above and a nonionic surfactant with a water phase containing either a cationic emulsifier or an anionic emulsifier.

Plant seeds that can be incorporated into the hydraulic mulch composition include seeds of grass, vines, flowers, grain, plants, bushes, trees, and any other growing vegetation useful in planting or replanting the soil surface.

Commercial fertilizers that can be incorporated into the hydraulic mulch compositions include water soluble nitrogeneous fertilizers which can also contain phosphorus and potassium as well as other materials.

The cellulose mulch employed in the hydraulic mulch compositions of the invention preferably is a mixture of cellulosic fibers, preferably wood pulp fibers in disintegrated form.

The hydraulic mulch of this invention is prepared by admixing the soil binding emulsion with the other ingredients, preferably while agitating until all of the soil binder emulsion has been added. It has been found that a longer time is required to stir in the fertilizer to the water phase since the fertilizer is slowly soluble. Mild agitation is sufficient, for example, stirring. In actual operation the soil binder emulsion is added to the water phase of the hydraulic mulch composition.

For application to a soil bed, the hydraulic mulch is preferably maintained under agitation and the composition is forced out upon the soil in a spray using any conventional equipment adapted for spraying forced mixtures. The mixture is applied at a rate sufficient to deposit the desired concentration of seed without applying so much liquid as to cause excessive runoff or channeling. In general, there will be deposited on the soil, based upon pounds/acre, 500–3,000 cellulose, 2–100 seeds and 50–1,000 fertilizer. The amount of water applied will range from 300–6,000 gallons/acre and 5–300 gallons/acre of soil binding emulsion. Upon subsidence of the aqueous portion of the mixture into the soil a thin, somewhat discontinuous film of rubber appears to form which anchors the seeds to the soil and provides sufficient water repellency to the surface to prevent washing away of the seeds and yet to permit breathing of the soil, i.e., access of air and moisture so that germination is not prevented.

The composition and the process of the invention provide an advantageous method of applying seeds and mulch in a single operation to large irregular areas with the result that the seeds are held firmly on the irregularities in contact with the soil until germination takes place to permanently anchor them to the base. The instant process speeds up seeding operations and leaves no undesired film on the areas after seedlings have grown. The seeds are anchored or mulched to the soil for a period sufficient for germination to occur, i.e., usually periods between about seven days and about three weeks or more, depending upon the type of seed, the locale, the amount and character of rainfall, etc., and the like.

The method involves the reduction of fire hazard when compared to the application of the usual soil retaining materials such as hay, straw, and other bulk materials generally used in soil stabilization. The process of the invention has many advantages in the stabilization of soil surfaces. It is easily and cheaply handled and applied in a combined simulataneous application of all the components necessary not only to maintain the surface prior to the establishment of vegetation, but also to establish vegetation rapidly and efficiently.

EXAMPLE 1

A series of emulsion batches were taken from production soil binding emulsions prepared according to the invention. The aromatic oil employed was a blend of aromatic oils identified as Philrich* A trademark of Phillips Petroleum Company, 5 rubber extender oil and distilled $SO_2$ extract oil which had been lime treated. In preparing the emulsions, the aromatic oil mixture is blended with a solution of butadiene-styrene rubber having an average molecular weight of about 122,000. Additional solvents for the rubber were trichloroethylene and xylene. A solid resin, Anares No. 1 from Neville Chemical Co., was added to the oil phase together with small quantities of Oronite NI-W surfactant. The mixture was heated and stirred until all components were fully dissolved.

The water for the water phase was mixed with a small amount of Redicote E-1 emulsifier. Small amounts of methanol and 31½ percent HCl were added to the water phase.

The emulsions are formed by dispersing the oil phase into the water phase. This is accomplished by admixing the oil phase with the water phase and pumping the mixture through a Gifford-Wood homogenizing pump.

The following recipe was used in the production unit:

OIL PHASE:                                                 Weight Percent
Rubber[1]                                                       9.0

| | |
|---|---|
| Anares No. 1[1] | 9.0 |
| Oronite NI-W | 1.0 |
| Philrich* 5 rubber extender oil | 24.3 |
| Distilled $SO_2$ extract oil, lime-treated | 2.7 |
| Trichloroethylene | 15.0 |
| Xylene | 10.0 |
| WATER PHASE: | |
| Redicote E-1 | 2.0 |
| Methanol | 2.0 |
| 31.5% HCl | 1.25 |
| Water | 23.75 |

Makeup temperatures were as follows:

| | °F |
|---|---|
| Oil phase makeup | 250 |
| Water phase makeup | 150–160 |
| Oil phase temperature for emulsion formation | 200–220 |
| Water phase temperature for emulsion formation | 140–160 |

(1) The rubber used was a lithium-catalyst polymerized butadiene-styrene copolymer with an average molecular weight of 122,000.
(2) Anares No. 1 is a solid resin at room temperature obtained from Neville Chemical Company.
*A trademark of Phillips Petroleum Company Batch data are given in Table 1 and comprise a substantial plant production quantity of the emulsions made over an extended period of time.

TABLE I
PRODUCTION BATCHES AND TEST DATA

| Batch No. | 110X[b] | Soil Penetration Time[e] Fresh Emulsion | After 40 F Pumping | Centrifuge Sediment,%[f] |
|---|---|---|---|---|
| 1[a] | F | 44" | Partly broken | — |
| 2 | G | 12" | 4'–46" | 0.05 |
| 3[a] | F | 38" | Partly broken | — |
| 4 | VG | 1'–10" | 2'–11" | — |
| 5 | VG | 33" | >15' | — |
| 6 | VG | 23" | 3'–45" | — |
| 7 | VG | 1'–5" | >15' | — |
| 8 | VG | 1'–10" | Partly broken | — |
| 9 | VG | 56" | — | — |
| 10 | VG | 1'–17" | — | — |
| 11 | VG | 1'–42" | — | — |
| 12 | VG | 1'–42" | 2'–15" | 0.10 |
| 13 | VG | 1'–58" | — | 0.10 |
| 14 | VG | 2'–5" | — | — |
| 15 | VG | 1'–25" | — | — |
| 16 | G | 1'–58" | — | — |
| 17 | G | 2'–44" | — | — |
| 18[c] | G | 37" | Partly broken | 0.1 |
| 19[d] | E | 45" | 2'–50" | <0.1 |
| 20 | E | 36" | 10'–0" | — |
| 21 | E | 1'–14" | 2'–23" | <0.1 |
| 22 | E | 1'–4" | >30" | <0.1 |
| 23 | E | 1'–15" | 1'–6" | <0.1 |
| 24 | E | 1'–5" | — | <0.1 | a — Faulty equipment produced batches which were discarded.
b — Appearance at 100 magnification of 1/19 emulsion/water dilution. F = Fair; G = Good; VG = Very Good; E = Excellent.
c — Higher shear pump test speed reduced from 1725 rpm to 950 rpm and continuing.
d — First batch made after decreasing Gifford-Wood homogenizing pump clearance from 0.010" to 0.007".
e — Time in minutes (') and seconds (") for 5 grams of dilute emulsion after dilution with 4 parts water to soak completely into a soil briquette made of Ottawa sand, silica and Dixie clay.
f — The emulsion concentrate is diluted with an equal volume of distilled water, mix thoroughly, fill two "carrot-shape" centrifuge tubes (when the density of the oil phase is less than that of the water phase, e.g., Emulsion AT, use Babcock-type centrifuge bottles), and precision universal centrifugal 2200 rpm, 1240 (rcf) relative centrifugal force 30 minutes. There will be either two or three layers: a water layer containing watersoluble ingredients and very small size emulsion particles, an emulsion layer containing larger size emulsion particles, and, if present, a sediment layer of large-size oil-phase particles, together with any insoluble contaminants present. Read the volume (in ml) of the sediment layer and multiply by the appropriate factor to convert to percent of the emulsion concentrate (2 for 100 ml tubes; 4 for 50 ml tubes). Decant or pipet into a small beaker an aliquot of the water layer obtained by centrifuging a 1:1 dilution of the emulsion concentrate, and determine the pH with a pH meter, following the operating instructions for the instrument.

All batches were stable to both sodium[a] and calcium chlorides[b] tests and showed good soil bond strength in soil briquettes developed overnight at 140° F.

The aromatic oil employed in the above example is approximately a 90/10 weight ratio of Philrich* A Phillips Petroleum Company trademark. 5 oil to distilled $SO_2$ extract oil and had a viscosity at 77° F of 3,450 centipoises.

a - Stability toward NaCl: Prepare a 5 percent solution of sodium chloride in distilled water. Filter. Weigh 20 gms emulsion concentrate into a 150 ml beaker, add 80 ml 5 percent sodium chloride solution and mix thoroughly using a rubber policeman. Pour into a stoppered 100 ml graduate and allow it to stand undisturbed for 24 hours. Creaming (stratification of the emulsion) is to be expected. If the emulsion layer is easily redispersible, rate as "passes." If the separated layer consists of oil-phase particles which cannot be redispersed by gentle stirring, rate as "fails."

b - Stability toward $CaCl_2$: Prepare a 10 percent solution of calcium chloride in distilled water. Filter. Weigh 20 gms emulsion concentrate into a 150 ml beaker, add 80 ml 10 percent calcium chloride solution and mix thoroughly using a rubber policeman. Pour into a stoppered 100 ml graduate and allow it to stand undisturbed for 2 hours. Creaming (stratification of the emulsion) is to be expected. If the emulsion layer is easily redispersible, rate as "passes." If the separated layer consists of oil- phase particles which cannot be redispersed by gentle stirring, rate as "fails." .

EXAMPLE II

A series of emulsion systems were prepared substantially as set forth in Example I, but employing aromatic oils having viscosities outside the range of the invention.

The following recipe was used in each of the runs:

| | Weight Percent |
|---|---|
| OIL PHASE: | |
| Rubber | 9.0 |
| Anares No. 1 | 9.0 |
| Oil | 27.0 |
| Trichloroethylene | 15.0 |
| Xylene | 10.0 |
| Oronite NI-W | 1.1 |
| WATER PHASE: | |
| Redicote E-1 | 2.0 |
| 31.5% HCl | 1.25 |
| Water | 25.65 |
| Total | 100.00 |

Results of the emulsions prepared with aromatic oils having viscosities outside the range of the invention are given below in Table II.

TABLE II

| | I | II | III |
|---|---|---|---|
| Oil used | Distilled $SO_2$ Extract | Califlux GP | 10 Kansas City Extract |
| Oil viscosity, cp at 77 F | 25 | 13,000 | 150 |
| TEST RESULTS: | | | |
| Soil Penetration: | | | |
| Fresh Emulsion | 28" | 24" | 24" |
| After 40 F pump | 2'–13" | Broke | 29" |
| 24-Hour NaCl stability | Pass | Pass | Pass |
| 24-Hour $CaCl_2$ stability | Pass | Pass | Pass |
| Soil Bond, dried overnight at 140 F | very poor | Good | Fair |
| Appearance at 100 X | very good | very good | very good |
| Centrifuge Sediment, % | 0.1 | 0.05 | 0.10 |

The low viscosity $SO_2$ extract oil provided a low temperature shear stable emulsion which had very poor soil bond character. The higher viscosity Califlux GP oil gave good soil bond properties but poor shear stability as the emulsion broke after pumping at 40° F. No. 10 Kansas City refinery extract oil showed good low temperature shear stability but only fair soil bond strength. All emulsions were very well formed.

EXAMPLE III

A number of emulsifier systems were investigated to provide a soil binding emulsion which would be stable in the following hydraulic mulch recipe:

TABLE III

Hydraulic Mulch Recipe

| | Weight Percent |
|---|---|
| Soil binder emulsion | 9.4 |
| Water | 84.7 |
| Fertilizers, various | 3.6 |
| Cellulose mulch (Conwed Hydromulch) | 1.9 |
| Seeds | 0.4 |

Two soil binding emulsions were prepared with emulsifier systems which have provided good emulsion stability in the above-defined hydraulic mulch recipe relative to the standard soil binding emulsion. These systems are shown as follows together with the standard soil binding emulsion recipe.

TABLE IV

Emulsion Recipe

| | Weight Percent | | |
|---|---|---|---|
| | Standard | A | B |
| OIL PHASE: | | | |
| Rubber[1] | 9.0 | 9.0 | 9.0 |
| Anares No. 1[2] | 9.0 | 9.0 | 9.0 |
| Distilled $SO_2$ extract oil | 2.7 | 2.7 | 2.7 |
| Philrich* 5 extender oil | 24.3 | 24.3 | 24.3 |
| Trichloroethylene | 15.0 | 15.0 | 15.0 |
| Xylene | 10.0 | 10.0 | 10.0 |
| Oronite NI-W (nonionic) | 1.0 | 2.5 | 1.0 |
| WATER PHASE: | | | |
| Redicote E-1 (cationic) | 2.0 | 0.5 | — |
| Duponol 80 (anionic) | — | — | 2.0 |
| Methanol | 2.0 | 2.0 | 2.0 |
| 31.5% HCl | 1.25 | 0.3 | — |
| Water | 23.75 | 24.7 | 25.0 |

(1) The rubber used was a lithium-catalyst polymerized butadiene-styrene copolymer with an average molecular weight of 122,000.
(2) Anares No. 1 is a solid resin at room temperature obtained from Neville Chemical Company.
*A trademark of Phillips Petroleum Company.

Referring to the above tubular data, recipe A of Table IV was a cationic emulsion system wherein the amount of nonionic surfactant was increased to 2.5 weight percent in comparison with 1 weight percent for the standard soil binding emulsion. In recipe B of Table IV an anionic emulsifier system comprising the Oronite NI-W and Duponol 80 was used. The two emulsions for recipes A and B were evaluated in the mulch recipe of Table III and results are set forth below.

TABLE V

| | (N-P-K) Fertilizer in Mulch | | |
|---|---|---|---|
| Fertilizer | 7-28-14 | 12-8-4 | 7-6-19 |
| Standard Recipe | Broken on makeup | Broken on makeup | Broken on makeup |
| Recipe A | Very good after standing 30 minutes → | | |
| | Fairly good after standing 1.5 hours → | | |
| Recipe B | Very good after standing 30 minutes | Poor after standing 30 minutes | Very good after standing 30 minutes |
| | Fairly good after standing 1.5 hours | Very poor after standing 1.5 hours | Poor after standing 1.5 hours |

EXAMPLE IV

The soil binding emulsion A of Example III, Table IV was selected for preparation of production batches for further evaluation. Two batches were prepared with pilot plant production rubber of a radial teleblock copolymer of 60 weight percent butadiene and 40 weight percent styrene having an average molecular weight of 116,000 (Copolymer No. 1). One of these batches was used in a hydraulic mulching application in a field location with excellent results reported. The other was compared to a third batch prepared with a production rubber copolymer No. 2 (same as copolymer No. 1 except the average molecular weight was 160,000) in the hydraulic mulch recipe, freeze-thaw stability tests, and 140° F aging tests to obtain additional performance data and also to evaluate production copolymer No. 2 in the soil binding emulsion system. Observations of these emulsions in the mulch recipe with three different fertilizers are set forth below.

TABLE VI

| Hydraulic emulsion No. | Standing time, hours | N-P-K fertilizer in mulch | | |
|---|---|---|---|---|
| | | 7-28-14 | 12-8-4 | 7-6-19 |
| 1 (production copolymer No. 1) | 2 | Very good. No free oil phase | | |
| Do. | 7 | Trace of oil phase on surface. Otherwise very stable. | Very good. No free oil phase. | |
| Do. | 24 | Same as 7-hour observations | | |
| 2 (production copolymer No. 2) | | Same observations at different standing times as for hydraulic emulsion No. 1 | | |

Both emulsions were completely satisfactory in each of the three fertilizer systems and were still in excellent shape after a 24-hour storage period.

Freeze-thaw tests were made by freezing emulsion samples at 0° F for a period of time, thawing to room temperature, and testing. After tests were completed, samples were returned to the freezer and the cycle repeated. Storage stability was determined periodically on emulsion samples stored at 140° F in a tray dryer. Results of both tests are set forth below.

TABLE VII

Freeze-Thaw Tests

| | | Hydraulic Emulsion No. | | | |
|---|---|---|---|---|---|
| | | 1 | | 2 | |
| Times Frozen | Hours Frozen | Soil Pen. Time | Cent.* Sed., % | Soil Pen. Time | Cent.* Sed., % |
| 0 | 0 | 21" | 0.1 | 21" | 0.1 |
| 1 | 72 | 23" | 0.1 | 22" | 0.1 |
| 2 | 168 | 11" | 0.1 | 9" | 0.05 |
| 3 | 144 | 10" | 0.1 | 19" | 0.1 |
| 4 | 144 | 11" | 0.1 | 10" | 0.1 |
| 5 | 144 | 10" | 0.05 | 10" | 0.05 |
| 6 | 144 | 14" | 0.1 | 16" | 0.05 |

*Centrifuge sediment. See footnote f, Table I.

TABLE VIII

140°F Storage Tests

| | Hydraulic Emulsion No. | | | |
|---|---|---|---|---|
| | 1 | | 2 | |
| Days Aged at 140°F | Soil Pen. Time | Cent. Sed., % | Soil Pen. Time | Cent. Sed., % |
| 0 | 21" | 0.05 | 21" | 0.05 |
| 10 | 12" | 0.1 | 12" | 0.1 |
| 17 | 8" | 0.1 | 10" | 0.1 |
| 24 | 10" | 0.1 | 8" | 0.1 |
| 31 | 17" | 0.1 | 13" | 0.1 |
| 41 | 18" | 0.3 | 11" | 0.4 |

100X magnification of 1/19 emulsion/water dilutions of all samples ranged from excellent to good. $CaCl_2$ stability of all samples after 24 hours ranged from fair to very good. NaCl stability of all samples after 24 hours ranged from very good to good.

Both freeze-thaw and 140° F storage stability were excellent for both batches. This emulsifier system provides freeze-thaw stability superior to that of the standard soil binder emulsifier system.

The hydraulic mulching application combined with the two stability determinations provide a severe test for emulsion stability. Only a very stable emulsion will survive.

I claim:

1. A hydraulic mulch composition which comprises:

a  5–15 weight percent of an oil-water emulsion in which the oil phase comprises a rubber dissolved in an aromatic oil having an aromatic content of at least 50 weight percent and a viscosity in the range 1,000–5,000 centipoises at 77° F, and wherein the oil-rubber phase comprises 50–85 weight percent of the total emulsion and the concentration of rubber in the oil phase is from 2 to 15 weight percent of the oil, b  2–5 weight percent commercial fertilizer, c  1–3 weight percent cellulose mulch, d  0.1–5 weight percent seeds, and e  the balance water.

2. A composition according to claim 1 wherein (a) there is additionally present in said oil phase a chlorinated hydrocarbon or aromatic hydrocarbon rubber solvent, and said rubber is a butadiene-styrene block copolymer.

3. A composition according to claim 2 wherein (a) contains a butadiene-styrene block copolymer rubber, said rubber solvent is a mixture of trichloroethylene and xylene, and the emulsifier is a mixture of nonionic and cationic emulsifiers wherein the amount of nonionic emulsifier present exceeds that of the cationic emulsifier.

4. A composition according to claim 2 wherein (a) comprises a butadiene-styrene block copolymer rubber, said rubber solvent is a mixture of trichloroethylene and xylene, and the emulsifier is a mixture of nonionic and anionic emulsifying agents.

5. A composition according to claim 1 wherein in (a) the aromatic oil therein is a mixture of aromatic oils comprising a rubber extender oil and an $SO_2$ extract oil.

6. A process for simultaneously seeding and mulching soil surfaces which comprises applying thereto a hydraulic mulch as defined in claim 1.

7. A process according to claim 6 wherein the seeds are grass seeds.

8. A process according to claim 6 wherein the surface seeded is a sloping surface.

* * * * *